United States Patent [19]

Fletcher et al.

[11] 3,763,928

[45] Oct. 9, 1973

[54] ELECTROSTATICALLY CONTROLLED HEAT SHUTTER

[76] Inventors: James C. Fletcher, Administrator of the National Aeronautics and Space Administration with respect to an invention of; Lloyd J. Derr, La Crescenta, Calif.

[22] Filed: June 28, 1972

[21] Appl. No.: 266,866

[52] U.S. Cl..................... 165/32, 165/96, 165/106, 244/1 SS

[51] Int. Cl..................... F28f 13/16

[58] Field of Search.................... 165/32, 96, 106; 244/1 SS

[56] References Cited

UNITED STATES PATENTS

| | | | |
|---|---|---|---|
| 1,980,821 | 11/1934 | Palueff | 165/1 X |
| 2,605,377 | 7/1952 | Kaehni et al. | 165/1 X |
| 3,018,087 | 1/1962 | Steele | 165/105 |
| 3,224,497 | 12/1965 | Blomgren, Sr. et al. | 165/2 |

*Primary Examiner*—Albert W. Davis, Jr.
*Attorney*—Monte F. Mott et al.

[57] ABSTRACT

A heat transfer assembly for conducting thermal energy includes a hermetically sealed container enclosing a quantity of inert gas such as nitrogen. Two opposed walls of the container have high thermal conducting characteristics while the connecting walls have low thermal conducting characteristics. Electrodes are positioned adjacent the high thermal conducting walls and biased relative to the conducting walls to a corona potential for creating an ionic gas wind which must contact the conducting walls to be neutralized. The contact of the gas molecules permits the maximum thermal energy transfer between the walls. Baffles can be positioned adjacent the electrodes to regulate gas flow between the high thermal conducting surfaces.

16 Claims, 2 Drawing Figures

ELECTROSTATICALLY CONTROLLED HEAT SHUTTER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates generally to heat transfer devices for moving thermal energy between two surfaces and more particularly to the movement of thermal energy with the assistance of an ionic wind created by a corona.

2. Description of the Prior Art

The phenomenon of corona has been known for many decades as a parasite of high voltage circuits. Various attempts have been made in the prior art to utilize the corona in a heat transfer function. For example, the Burke U.S. Pat. No. 1,835,557 (1931) attempted to increase the rate of heat transfer between a solid surface and a body of gas moving in contact with the surface by producing an electrical discharge in the body of gas to rupture the boundary layer of gas film that is adjacent the surface of the solid.

The fact that a corona created an electrostatic wind which originated at the point of the discharge was first discovered in the early 1940's by Dr. Siegfried Klein of France. The subsequent experiments with this electrostatic wind were in the field of designing diaphragmless loud speakers by electrically modulating the wind's velocity. These attempts were not commercially successful.

Vellkoff in 1962 showed by optical interferometer methods that the isothermal boundary layers of a heated object were severely compressed by the high electrical field associated with a corona, thereby improving the object's heat transfer coefficient by a factor of four. He did not, however, credit electric wind. Vellkoff, Henry Rene', *Investigation of the Effects of Electrostatic Fields on Heat Transfer and Boundary Layers*, Technical Document No. ASD-TDR-62-650, for the Propulsion Laboratory, Aeronautical Systems Division, Air Force Systems Command, Wright-Patterson Air Force Base, Ohio, dated September, 1962.

The fact that a corona is capable of cooling a heated object was discovered apparently by accident by Oscar Blomgren and resulted in U.S. Pat. No. 3,224,497 (1965).

Subsequent work on the effects of corona and heat transfer has been performed such as disclosed in the U.S. Pat. No. 3,526,268 granted to Robinson where a corona is established at the heated surface to increase the heat transfer between the surface and the ambient.

These prior art patents which attempt to utilize a corona to increase the heat transmission have not fully recognized the principles involved in the transmission of heat either to or from a surface under the influence of a corona. Accordingly, they have not optimized the possibilities of heat transfer nor suggested a form of heat transfer assembly that would be easily adaptable to such diverse employment as in spacecraft applications.

It is accordingly the intention of the present invention to provide an improved heat transfer apparatus which maximizes the transfer of heat with a hermetically sealed container utilizing an inert gas.

OBJECTS AND SUMMARY OF THE INVENTION

It is the primary object of the present invention to provide an improved heat transfer apparatus utilizing a hermetically sealed container which by electrical forces absorbs heat at one side of the container and forceably delivers it to another relatively cooled side of the container.

It is another object of the present invention to provide a variable heat transmitting thermal conductive gas chamber having electrodes positioned adjacent each effective thermal conducting wall of the container.

It is another object of the present invention to utilize cone shaped electrodes to optimize the corona.

It is a further object of the present invention to provide baffles positioned within the thermally conductive gas container to utilize the electrode corona pressure zone for establishing thermal gas flow.

It is a still further object of the present invention to provide a hermetically sealed container having insulated side walls of a cone shape presenting an area differentation between the conductive walls for utilization in a space vehicle to cool spacecraft components which are heat generating devices.

Briefly described, the present invention involves a heat transfer assembly for conducting thermal energy utilizing a hermetically sealed container enclosing a quantity of an inert gas such as nitrogen. Two opposed walls of the container have a high thermal conducting characteristic while the connecting walls have a low thermal characteristic. Electrodes are positioned adjacent the conducting walls and biased relative to the conducting walls to a corona potential for creating an ionic gas wind. The ionized molecules must contact the conducting walls to be neutralized and accordingly during their contact with the walls permit the maximum thermal energy transfer. Baffles can be positioned adjacent the electrodes to regulate gas flow between the conducting surfaces by utilizing the high pressure zone adjacent the electrodes. The electrodes are preferably of a cone shape having an angle of approximately 60 degrees and are positioned as close to the conducting walls as possible without arcing at the maximum bias potential. The bias potential can be adjusted to regulate the amount of heat transmitted across the container.

Further objects and the many attendant advantages of the invention will be more readily appreciated as the same becomes better understood by reference to the following detailed description which is to be considered in connection with the accompanying drawings wherein like reference symbols designate like parts throughout the figures thereof.

DETAILED DESCRIPTION OF THE PREFERRED EMBODIMENT

Figure 1:
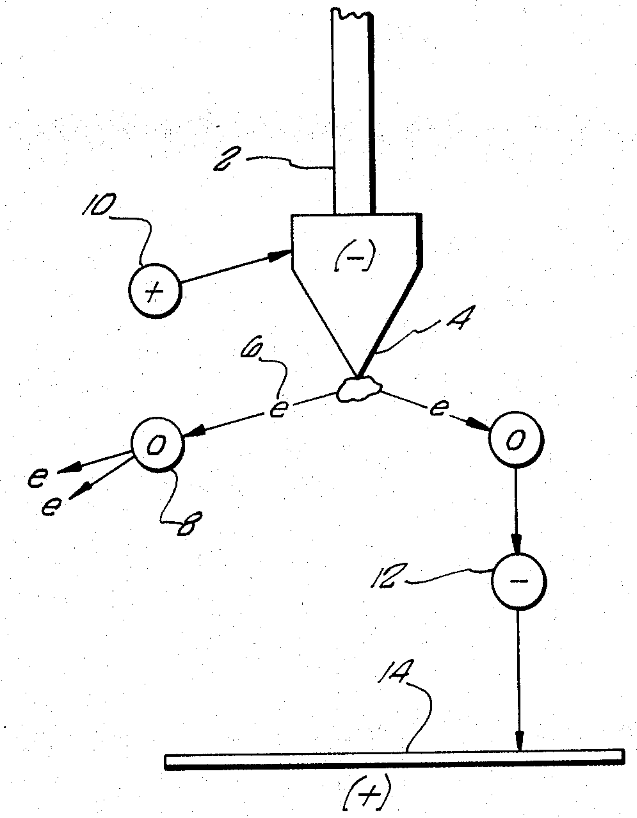
FIG. 1 is an illustrative drawing of the corona effect.

Referring to FIG. 1 of the drawings, an enlarged view of an electrode probe 2 is presented during a corona discharge to a thermally conductive surface 14. The corona is positioned off the tip 4 of the electrode and it is believed that nearly 80 percent of the potential fall between the electrode probe and the charged thermal conductive surface will occur within a distance of 0.1 centimeter of the corona point for a system where the separation will be approximately 3 centimeters. Thus, for a 25 KV electrode potential, the accelerating field close to the corona point may be as high as 200,000 volts per centimeter. The resultant electric wind is composed of ions created by the accelerated electrons 6 of the corona. The accelerated electrons 6 will contact a neutral gas molecule and either be captured to become a negative ion 12 which will become part of the ionic wind or will knock an electron off of the neutral molecule 8 to produce a positive ion 10 that will return to the electrode probe 2 to be neutralized. The negative ions 12 will be repulsed from the electrode probe 2 and will be transported by the electrostatic field to be neutralized by the conductive surface 14. It has been shown that the ionized wind will perform a superior cooling function over an electrically neutral wind of equal strength. The charged molecules of the ion wind must actually touch the thermal conductive surface 14 to be neutralized and thereby extract the maximum thermal energy. A neutral molecule might only approach the heated surface close enough to extract rising thermal energy. While the ion wind will pierce the isothermal boundary layers of a heated object easier than a neutral molecule. In the preferred embodiment, the negative potential is utilized on the probe; however, it would be possible to utilize a positive potential on the electrode probe 2 with the roles of the positive and negative ions 10 and 12 respectively reversed with the positive ionized wind traveling to the thermal conductive surface 14 while the negative ions 12 would be neutralized at the probe 2.

Figure 2:
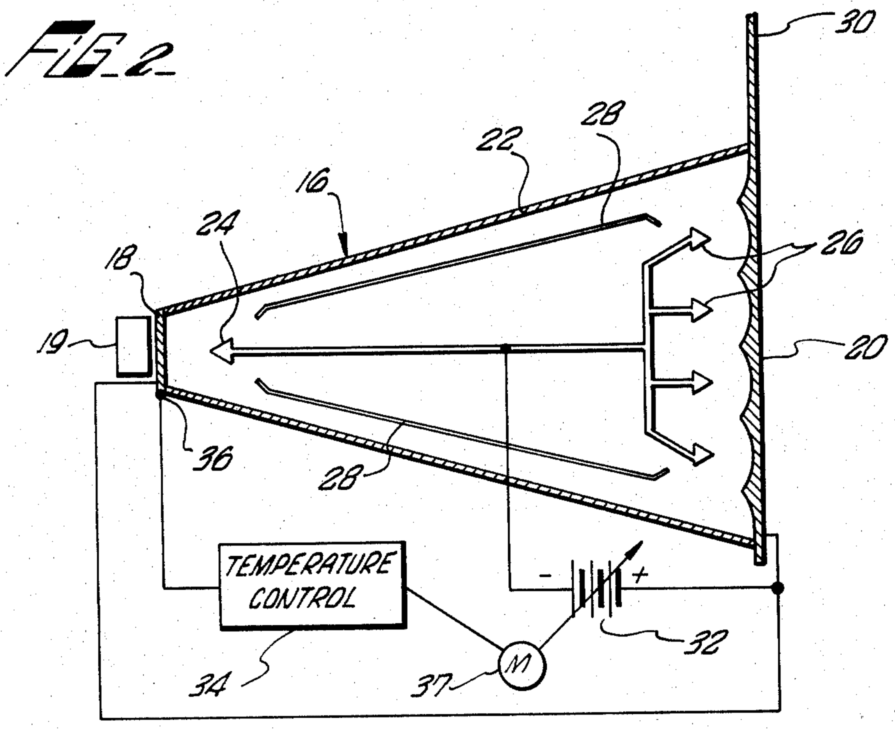
FIG. 2 is a schematic of a cooling system according to the present invention.

Referring to FIG. 2, a spacecraft cooling system is disclosed comprising a hermetically sealed container 16 having a small conductive wall 18 adjacent the heat source 19. The object being cooled can, for example, be a transmitter tube and the bias voltage for the tube can be used for effecting the cooling. An electrode 24 is advantageously positioned as close as possible to the thermal conductive wall 18 without arcing at the maximum voltage that is capable of being applied by the variable voltage source 32. A large thermal conductive wall 20 likewise has a number of electrodes 26 similarly positioned. The electrodes 24 and 26 are biased to the same potential while the thermal conductive walls 18 and 20 are similarly biased to the opposing potential. The thermally conducting walls 18 and 20 are interconnected by an insulating wall 22.

The container 16 holds a quantity of inert gas such as nitrogen at 1 atmosphere of pressure. The cooling effect can be produced in atmospheric air but small amounts of ozone and nitric acid are produced by the corona. These agents contaminate and erode the fine point of the electrodes thereby reducing their effectiveness. The use of stainless steel for the electrode can minimize this problem to a degree. With the use of a gas such as nitrogen, the problem is avoided.

Advantageously, the interior wall surface of conducting wall 20 will have a configuration to maximize the application of the individual ionic winds from each electrode 26. The conductive wall 20 will be positioned, for example, in a shaded area of the space vehicle's side 30. Thereby the heat will be radiated into outer space. The variable voltage source 32 can be controlled by a temperature control 34 that receives signals from a heat transducer such as a thermocouple 36 connected to the thermal conductive wall 18. A motor 37 can adjust through appropriate mechanical linkage, not shown, the voltage.

Heat baffles 28 are positioned to take advantage of the high pressure zone generated adjacent the electrode tips to thereby establish a flow pattern for both the hot and cold neutral molecules. These baffles are especially important in a spacecraft that is not subject to gravitational forces capable of creating a convective flow path whereby the molecules having a greater thermal energy will rise and the molecules having a lesser thermal energy will fall relative to the earth's gravitational pull.

Various forms of inert gases such as nitrogen, neon, helium, argon, and carbon dioxide among others can be utilized in the cooling system. The cone shape of the container 16 will provide an appropriate area differential between the small and large thermal conducting walls 18 and 20 to facilitate the heat transfer into outer space. The cooling system of the present invention can be utilized, for example, in cooling of spacecraft transmitter tubes and high power solid state chips using their bias voltages and possible internal heat control systems for manned spacecrafts.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A heat transfer assembly for conducting thermal energy comprising:

a hermetically sealed container having one surface transmitting thermal energy into the container and another surface transmitting thermal energy from the container;

a set quantity of gas sealed within the container for conducting thermal energy;

at least a pair of electrodes, one positioned adjacent the surface transmitting thermal energy into the container and the other positioned adjacent the surface transmitting thermal energy out of the container; and means for biasing the two electrodes to a corona potential relative to their respective surfaces thereby creating a corona wind of the thermal conducting gas at each electrode for contacting the respective surfaces and transmitting thermal energy.

2. A heat transfer assembly as in claim 1 where the surfaces of the container connecting the heat transmitting surfaces are of a low heat conducting material.

3. A heat transfer assembly as in claim 1 where the means for biasing the electrodes includes a variable voltage source.

4. A heat transfer assembly as in claim 1 where additional electrodes are positioned adjacent the surface transmitting thermal energy out of the container.

5. A heat transfer assembly as in claim 1 where the container has a cone shape with the surface transmitting thermal energy into the container being the smallest surface.

6. A heat transfer assembly as in claim 1 where the electrodes have a cone shape with a solid angle of about 60°.

7. A heat transfer assembly as in claim 1 where the thermal conducting gas is inert.

8. A heat transfer assembly as in claim 1 further including baffle members positioned adjacent the high pressure zone of the electrodes to establish separate flow conduits within the sealed container for the relatively hot and cold thermal conducting gases.

9. A heat transfer assembly as in claim 1 further including means for controlling the bias of the electrodes in response to the temperature of the surface transmitting thermal energy into the container.

10. A heat transfer assembly as in claim 3 where the variable voltage source is direct current and the electrodes are positioned as close to the heat transmitting surfaces as possible without arcing at the maximum potentials of voltage.

11. A heat transfer assembly as in claim 4 where the heat transferring surface adjacent the multiple electrodes has a surface configuration to maximize the contact of the generated corona winds with the surface.

12. A heat transfer assembly as in claim 7 where the inert gas is nitrogen.

13. A heat transfer assembly as in claim 7 where the inert gas is neon.

14. A heat transfer assembly for conducting thermal energy from a space vehicle comprising:

a hermetically sealed container having a high heat conducting surface transmitting thermal energy into the container and another separate high heat conducting surface transmitting thermal energy from the container for radiation from the space vehicle;

a quantity of inert thermal conducting gas sealed within the container;

at least a pair of electrodes, one positioned adjacent the surface transmitting thermal energy into the container and the other positioned adjacent the surface transmitting thermal energy out of the container;

means for variably biasing the two electrodes to a corona potential relative to their respective surfaces thereby creating a corona wind of the thermal conducting gas at each electrode for contacting the respective surfaces and transmitting thermal energy; and baffle means positioned adjacent the high pressure zone of the electrodes for establishing separate flow conduits for the relatively hot and cold themal conducting gases.

15. A heat transfer assembly as in claim 14 further including means for controlling the bias of the electrodes in response to the temperature of the surface transmitting thermal energy into the container.

16. A heat transfer assembly as in claim 15 where the inert gas is nitrogen.

* * * * *